United States Patent
Tamura et al.

(10) Patent No.: US 9,472,823 B2
(45) Date of Patent: *Oct. 18, 2016

(54) HYDROGEN GENERATOR AND FUEL CELL SYSTEM

(71) Applicant: Panasonic Intellectual Property Management Co., Ltd., Osaka (JP)

(72) Inventors: Yoshio Tamura, Hyogo (JP); Koichi Kusumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/648,237

(22) PCT Filed: Oct. 16, 2013

(86) PCT No.: PCT/JP2013/006144
§ 371 (c)(1),
(2) Date: May 28, 2015

(87) PCT Pub. No.: WO2014/103111
PCT Pub. Date: Jul. 3, 2014

(65) Prior Publication Data
US 2015/0311550 A1    Oct. 29, 2015

(30) Foreign Application Priority Data
Dec. 27, 2012   (JP) .................................. 2012-285666

(51) Int. Cl.
*H01M 8/06* (2016.01)
*H01M 8/12* (2016.01)
(Continued)

(52) U.S. Cl.
CPC ........... *H01M 8/0618* (2013.01); *B01J 19/245* (2013.01); *C01B 3/32* (2013.01);
(Continued)

(58) Field of Classification Search
CPC ... C01B 3/32; C01B 3/38; C01B 2203/1258; C01B 2203/127; C01B 2203/148; C01B 2203/0227; C01B 2203/1211; C01B 2203/0805; C01B 2203/067; C01B 2203/045; H01M 8/0618; H01M 8/0675; H01M 8/0625; H01M 8/1246; H01M 2008/1293; H01M 2250/10; H01M 2300/0074; Y02E 60/50; Y02E 60/521; Y02E 60/525; B01J 2219/24; B01J 2219/00087; B01J 19/245
See application file for complete search history.

(56) References Cited

FOREIGN PATENT DOCUMENTS

| JP | 7-215701 A | 8/1995 |
|---|---|---|
| JP | 2006-054171 A | 2/2006 |

(Continued)

OTHER PUBLICATIONS

International Search Report issued in corresponding International Patent Application No. PCT/JP2013/006144, mailed on Dec. 10, 2013; 2 pages with English translation.

*Primary Examiner* — Brittany Raymond
(74) *Attorney, Agent, or Firm* — McDermott Will & Emery LLP

(57) ABSTRACT

A hydrogen generator includes: a reformer operative to generate a hydrogen-containing gas by using a raw material gas; a hydro-desulfurizer operative to remove a sulfur compound in the raw material gas; a recycle passage through which the hydrogen-containing gas is supplied to the raw material gas before the raw material gas flows into the hydro-desulfurizer; an ejector which is disposed on a raw material gas passage provided upstream of the hydro-desulfurizer and into which the hydrogen-containing gas flows from the recycle passage; and a heater operative to heat the ejector.

7 Claims, 7 Drawing Sheets

(51) Int. Cl.
  *B01J 19/24*  (2006.01)
  *C01B 3/32*  (2006.01)
  *C01B 3/38*  (2006.01)
(52) U.S. Cl.
  CPC .............. *C01B 3/38* (2013.01); *H01M 8/0625* (2013.01); *H01M 8/0675* (2013.01); *H01M 8/1246* (2013.01); *B01J 2219/00087* (2013.01); *B01J 2219/24* (2013.01); *C01B 2203/0227* (2013.01); *C01B 2203/045* (2013.01); *C01B 2203/067* (2013.01); *C01B 2203/0805* (2013.01); *C01B 2203/127* (2013.01); *C01B 2203/1211* (2013.01); *C01B 2203/1258* (2013.01); *C01B 2203/148* (2013.01); *H01M 2008/1293* (2013.01); *H01M 2250/10* (2013.01); *H01M 2300/0074* (2013.01); *Y02B 90/14* (2013.01); *Y02E 60/50* (2013.01); *Y02E 60/521* (2013.01); *Y02E 60/525* (2013.01)

(56) References Cited

FOREIGN PATENT DOCUMENTS

| | | |
|---|---|---|
| JP | 2006-104003 A | 4/2006 |
| JP | 2008-287959 A | 11/2008 |
| JP | 2009-256120 A | 11/2009 |
| JP | 2011-216308 A | 10/2011 |

HYDROGEN GENERATOR AND FUEL CELL SYSTEM

RELATED APPLICATIONS

This application is the U.S. National Phase under 35 U.S.C. §371 of International Patent Application No. PCT/JP2013/006144, filed on Oct. 16, 2013, which in turn claims the benefit of Japanese Application No. 2012-285666, filed on Dec. 27, 2012, the disclosures of which Applications are incorporated by reference herein.

TECHNICAL FIELD

The present invention relates to a hydrogen generator and a fuel cell system.

BACKGROUND ART

Since means for supplying hydrogen used as a fuel when a fuel cell system generates electric power has not been developed as a common raw material infrastructure, the fuel cell system normally includes a reformer which generates a hydrogen-containing gas from a city gas, a natural gas, a LPG, or the like supplied from the common raw material infrastructure.

The reformer causes a reaction of a raw material gas, such as the city gas, by using a reforming catalyst at a high temperature of about 600° C. to 700° C. to generate a hydrogen-containing gas containing hydrogen as a major component. In this case, the raw material gas contains a sulfur compound, and the sulfur compound needs to be removed since it is a poisoning material for the reforming catalyst. For example, the sulfur compound can be removed from the raw material gas by mixing a hydrogen gas and the raw material gas to cause hydrodesulfurization.

Here, proposed is a device configuration in which: a part of the hydrogen-containing gas generated by a reforming reaction of the reformer is returned to a raw material gas passage as the hydrogen for the hydrodesulfurization (hereinafter referred to as "recycling"); and a condenser is disposed on a recycle passage to suppress passage clogging of the recycle passage by condensed water (see PTL 1, for example).

CITATION LIST

Patent Literature

PTL 1: Japanese Laid-Open Patent Application Publication No. 2011-216308

SUMMARY OF INVENTION

Technical Problem

However, PTL 1 does not discuss a problem regarding the condensed water in an ejector into which the hydrogen-containing gas flows from the recycle passage.

The present invention was made under such circumstances, and an object of the present invention is to provide a hydrogen generator and a fuel cell system, by each of which a possibility that passage resistance increases by condensed water in an ejector into which a hydrogen-containing gas flows from a recycle passage or a possibility that passage clogging occurs by the condensed water in the ejector can be made lower than conventional cases.

Solution to Problem

To solve the above problems, a hydrogen generator according to one aspect of the present invention includes: a reformer operative to generate a hydrogen-containing gas by using a raw material gas; a hydro-desulfurizer operative to remove a sulfur compound in the raw material gas; a recycle passage through which the hydrogen-containing gas is supplied to the raw material gas before the raw material gas flows into the hydro-desulfurizer; an ejector which is disposed on a raw material gas passage provided upstream of the hydro-desulfurizer and into which the hydrogen-containing gas flows from the recycle passage; and a heater operative to heat the ejector.

Advantageous Effects of Invention

In the hydrogen generator and the fuel cell system according to the aspect of the present invention, the possibility that the passage resistance increases by the condensed water in the ejector into which the hydrogen-containing gas flows from the recycle passage or the possibility that the passage clogging occurs by the condensed water in the ejector can be made lower than the conventional cases.

DESCRIPTION OF EMBODIMENTS

Embodiment 1

The present inventors have diligently studied a problem regarding condensed water in an ejector into which a hydrogen-containing gas flows from a recycle passage. As a result, the present inventors have obtained the following findings.

A recycled gas contains steam, so that if the recycled gas is cooled, the condensed water is generated from the recycled gas. For example, when the recycled gas is mixed with a raw material gas lower in temperature than the recycled gas, the recycled gas is cooled. Therefore, there is a possibility that passage resistance increases by the condensed water in the ejector where these gases meet or a possibility that passage clogging or the like occurs by the condensed water in the ejector.

Here, a hydrogen generator according to Embodiment 1 includes: a reformer operative to generate a hydrogen-containing gas by using a raw material gas; a hydro-desulfurizer operative to remove a sulfur compound in the raw material gas; a recycle passage through which the hydrogen-containing gas is supplied to the raw material gas before the raw material gas flows into the hydro-desulfurizer; an ejector which is disposed on a raw material gas passage provided upstream of the hydro-desulfurizer and into which the hydrogen-containing gas flows from the recycle passage; and a heater operative to heat the ejector.

According to this configuration, the ejector is heated by the heater. Therefore, even if the hydrogen-containing gas flows into the ejector, the possibility that the passage resistance increases by the condensed water in the ejector or the possibility that the passage clogging occurs by the condensed water in the ejector can be made lower than the conventional cases.

Device Configuration

Figure 1:
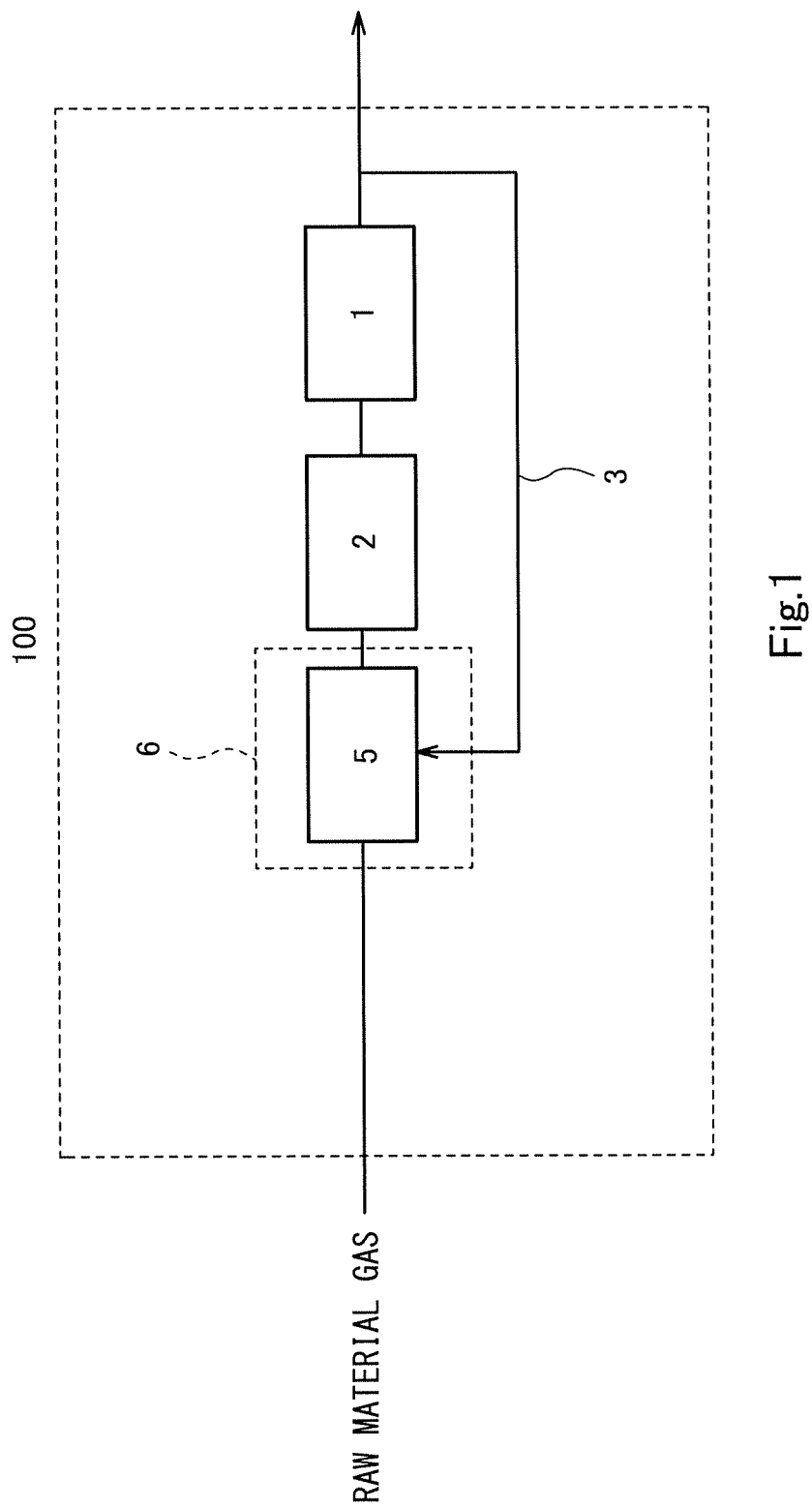
FIG. 1 is a diagram showing one example of a hydrogen generator according to Embodiment 1.

FIG. 1 is a diagram showing one example of the hydrogen generator according to Embodiment 1.

In the example shown in FIG. 1, a hydrogen generator 100 according to the present embodiment includes a reformer 1, a hydro-desulfurizer 2, a recycle passage 3, an ejector 5, and a heater 6.

The reformer 1 generates the hydrogen-containing gas by using the raw material gas. Specifically, a reforming catalyst portion (not shown) in the reformer 1 causes a reforming reaction of the raw material gas to generate the hydrogen-containing gas. The reforming reaction may be any type, and examples thereof include a steam-reforming reaction, an autothermal reaction, and a partial oxidation reaction. Although not shown in FIG. 1, devices required for respective reforming reactions are suitably provided. For example, in a case where the reforming reaction is the steam-reforming reaction, the hydrogen generator 100 includes a combustor configured to heat the reforming catalyst portion, an evaporator configured to generate steam, and a water supply unit configured to supply water to the evaporator. In a case where the reforming reaction is the autothermal reaction, the hydrogen generator 100 further includes an air supply unit configured to supply air to the reformer. The raw material gas contains an organic compound constituted by at least carbon and hydrogen, and examples thereof include a city gas containing methane as a major component, a natural gas, and a LPG The hydro-desulfurizer 2 removes the sulfur compound in the raw material gas. The hydro-desulfurizer 2 is configured such that a hydrodesulfurization agent is filled in a container. Used as the hydrodesulfurization agent is, for example, a CuZn-based catalyst having both a function to convert the sulfur compound into hydrogen sulfide and a function to adsorb the hydrogen sulfide. However, the hydrodesulfurization agent is not limited to this example. The hydrodesulfurization agent may be constituted by: a CoMo-based catalyst that converts the sulfur compound in the raw material gas into the hydrogen sulfide; and a ZnO-based catalyst or CuZn-based catalyst as a sulfur adsorbent that is provided downstream of the CoMo-based catalyst and removes the hydrogen sulfide by adsorption.

The recycle passage 3 is a passage through which the hydrogen-containing gas is supplied to the raw material gas before the raw material gas flows into the hydro-desulfurizer 2. An upstream end of the recycle passage 3 may be connected to any portion of a passage through which the hydrogen-containing gas from the reformer 1 flows. For example, in a case where a CO reducer configured to reduce carbon monoxide in the hydrogen-containing gas is provided downstream of the reformer 1, the upstream end of the recycle passage 2 may be connected to a passage extending between the reformer 1 and the CO reducer, the CO reducer, or a passage provided downstream of the CO reducer. In a case where the CO reducer includes: a shift converter configured to reduce the carbon monoxide by a shift reaction; and a CO remover configured to reduce the carbon monoxide by at least one of an oxidation reaction and a methanation reaction, the upstream end of the recycle passage 3 may be connected to a passage extending between the shift converter and the CO remover. The upstream end of the recycle passage 3 may be connected to a passage provided downstream of a device (such as a fuel cell) that utilizes the hydrogen-containing gas. The hydrogen generator 100 does not have to include the CO reducer as long as it can provide a required performance with respect to a device that uses the hydrogen-containing gas generated by the hydrogen generator 100.

The ejector 5 is disposed on the raw material gas passage provided upstream of the hydro-desulfurizer 2, and the hydrogen-containing gas from the recycle passage 3 flows into the ejector 5. Specifically, the ejector 5 is a device configured to reduce a cross-sectional area of the raw material gas passage through which the raw material gas flows, to increase the flow velocity of the raw material gas and generate pressure lower than pressure of a low flow velocity portion. The raw material gas passage is a passage through which the raw material gas supplied to the reformer 1 flows.

For example, the recycle passage 3 may merge with the raw material gas passage in the ejector 5 at a position where the flow velocity of the raw material is the highest. At the position where the flow velocity of the raw material gas is the highest, the gas pressure becomes the lowest. Therefore, in a case where the cross-sectional area of the gas passage of the ejector 5 is designed such that the gas pressure becomes lower than the pressure of the upstream side of the recycle passage 3, the hydrogen-containing gas of the recycle passage 3 can be drawn into the ejector 5. By the action of drawing the hydrogen-containing gas into the ejector 5 as above, a device (such as a pressure reducer) configured to adjust the pressure balance does not have to be disposed on the recycle passage 3. With this, the configuration of the hydrogen generator 100 can be simplified, and the cost of the hydrogen generator 100 can be reduced.

The heater 6 heats the ejector 5. The raw material gas and the hydrogen-containing gas flow through the ejector 5. The hydrogen-containing gas contains steam. Therefore, when the hydrogen-containing gas is cooled, the condensed water may be generated from the steam. For example, in a case where the raw material gas is lower in temperature than the hydrogen-containing gas, the hydrogen-containing gas is cooled by mixing the hydrogen-containing gas with the raw material gas. In this case, the passage resistance may increase by the condensed water in the ejector 5, or the passage clogging or the like may occur by the condensed water in the ejector 5. For example, at the thin portion of the raw material gas passage in the ejector 5, the passage resistance is easily increased by the condensed water, or the passage clogging easily occurs by the condensed water. In a case where the passage resistance is increased, a predetermined amount of hydrogen-containing gas cannot be supplied to the hydro-desulfurizer 2. In this case, the hydrodesulfurizer 2 may not adequately remove the sulfur compound in the raw material gas, and the reforming catalyst of the reformer 1 may be poisoned by the sulfur compound. In a case where the passage clogging has occurred, a predetermined amount of raw material gas cannot be supplied, so that the hydrogen-containing gas may not be generated by the reformer 1.

Therefore, in the present embodiment, the heater 6 heats the ejector 5 as described above. With this, the steam of the hydrogen-containing gas in the ejector 5 is prevented from being condensed.

The heater 6 may be any heat source as long as it can heat the ejector 5.

For example, the ejector 5 can be heated by heat generated by the reformer 1. In this case, the ejector 5 may be provided on a surface of the reformer 1 or may be provided inside the reformer 1.

In addition, the ejector 5 can be heated by heat generated by a device (such as a fuel cell) that utilizes the hydrogen-containing gas. For example, in the case of the fuel cell, such as a solid-oxide fuel cell, which operates at high temperature, the ejector 5 may be provided inside a hot module of the fuel cell.

In a case where the hydrogen generator 100 includes a combustor configured to heat the reformer 1, the ejector 5 can be heated by heat of a flue gas of the combustor.

The ejector 5 can be heated by a dedicated heat source (such as an electric heater).

Operations

Hereinafter, the operations of the hydrogen generator 100 will be explained in reference to FIG. 1.

While the hydrogen generator 100 is operating, the raw material gas flows through the hydro-desulfurizer 2, so that the sulfur compound in the raw material gas is removed.

A part of the hydrogen-containing gas generated by the reformer 1 is returned through the recycle passage 3 to the raw material gas passage, mixed with the raw material gas, and then supplied to the hydro-desulfurizer 2. By supplying the hydrogen-containing gas to the hydro-desulfurizer 2, the hydro-desulfurizer 2 can remove the sulfur compound in the raw material gas by the hydrogenation reaction.

At this time, in the present embodiment, the hydrogen-containing gas from the reformer 1 flows through the recycle passage 3, is mixed with the raw material gas in the ejector 5, and is then supplied to the hydro-desulfurizer 2. To be specific, the mixture gas obtained by mixing the raw material gas and the recycled gas flows through the raw material gas passage provided downstream of the merging portion where the recycle passage 3 and the raw material gas passage merge with each other. The cross-sectional area of the raw material gas passage in the ejector 5 gradually decreases as described above, and the cross-sectional area of the raw material gas passage provided downstream of the merging portion where the recycle passage 3 and the raw material gas passage merge with each other gradually increases. With this, since the flow velocity of the raw material gas becomes the highest at the merging portion, the gas pressure becomes the lowest. Then, in a case where the cross-sectional area of the gas passage of the ejector 5 is designed such that the gas pressure of the merging portion becomes lower than the pressure of the upstream side of the recycle passage, the recycled gas can be drawn into the raw material gas passage.

Then, in the present embodiment, when the recycled gas is drawn into the raw material gas passage, the ejector 5 is being heated by the heater 6. The heating temperature of the ejector 5 may be any temperature as long as it is equal to or higher than a dew point of the recycled gas. With this, the steam in the ejector 5 is prevented from being condensed. Thus, the possibility that the passage resistance increases by the condensed water in the ejector 5 or the possibility that the passage clogging occurs by the condensed water in the ejector 5 can be made lower than conventional cases.

The heating of the ejector 5 at the time of the start-up of the hydrogen generator 100 may be started, for example, before the recycled gas starts flowing through the recycle passage 3.

Embodiment 2

The present inventors have diligently studied a problem regarding the condensed water in a booster configured to supply the raw material gas to the reformer. As a result, the present inventors have obtained the following findings.

The recycled gas contains steam, so that if the recycled gas is cooled, the condensed water is generated from the recycled gas. Here, in the fuel cell system described in PTL 1 in which the raw material gas and the recycled gas are mixed with each other at an upstream side of the booster, in a case where the raw material gas lower in temperature than the recycled gas is mixed with the recycled gas, the recycled gas is cooled, so that the condensed water flows into the booster that is a destination to which the raw material gas and the recycled gas are supplied. In this case, the passage resistance increases by the condensed water in the booster, or the passage clogging or the like occurs by the condensed water in the booster. Therefore, a problem of being unable to supply the gas at an appropriate flow rate, a problem of the breakdown of the booster, or the like may occur.

Here, the hydrogen generator according to Embodiment 2 is configured such that: the hydrogen generator according to Embodiment 1 includes a booster operative to supply the raw material gas to the reformer; and the ejector is disposed on the raw material gas passage provided downstream of the booster.

According to this configuration, the hydrogen-containing gas from the recycle passage flows into the ejector provided downstream of the booster. Therefore, the inflow of the condensed water into the booster configured to supply the raw material gas to the reformer can be suppressed as compared to conventional cases. In addition, as described above, the possibility that the passage resistance increases by the condensed water in the ejector or the possibility that the passage clogging occurs by the condensed water in the ejector can be made lower than the conventional cases.

Except for the above features, the hydrogen generator according to the present embodiment may be the same in configuration as the hydrogen generator according to Embodiment 1.

Device Configuration

Figure 2:
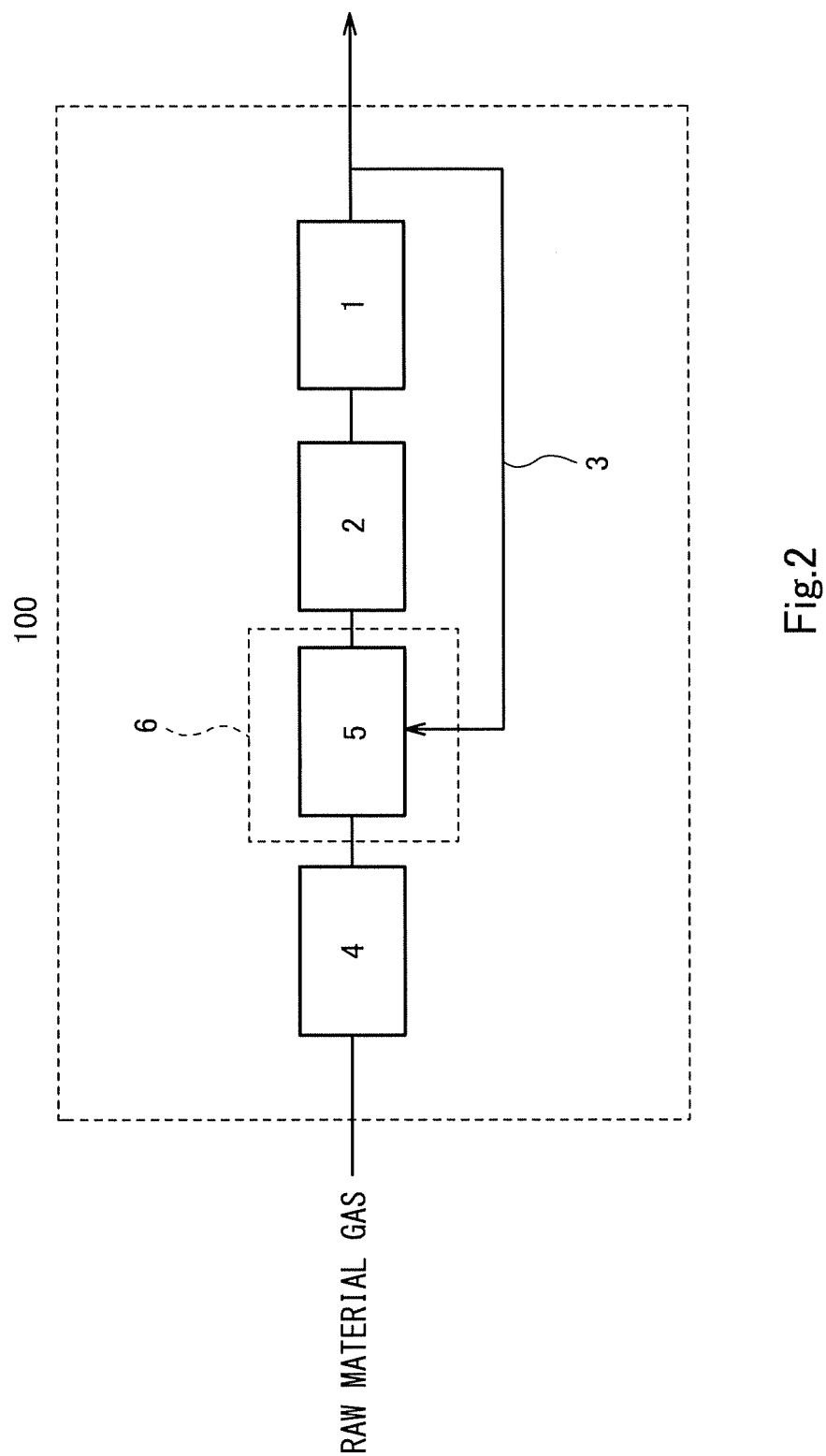
FIG. 2 is a diagram showing one example of the hydrogen generator according to Embodiment 2.

FIG. 2 is a diagram showing one example of the fuel cell system according to Embodiment 2.

In the example shown in FIG. 2, the hydrogen generator 100 according to the present embodiment includes the reformer 1, the hydro-desulfurizer 2, the recycle passage 3, a booster 4, the ejector 5, and the heater 6.

Since the reformer 1, the hydro-desulfurizer 2, the recycle passage 3, and the heater 6 are the same as those in Embodiment 1, explanations thereof are omitted.

The booster 4 supplies the raw material gas to the reformer 1. To supply the raw material gas to the reformer 1 and the hydro-desulfurizer 2, the pressure of the raw material gas is increased by the booster 4. To be specific, to cause a predetermined amount of raw material gas to flow, the pressure of the raw material gas needs to be increased up to pressure determined in consideration of a passage resistance in a device provided downstream of the booster 4. The booster 4 may have any configuration as long as it can increase the pressure of the raw material gas. One example of the booster 4 is a diaphragm pump. The raw material gas is supplied from a raw material gas supply source. The raw material gas supply source has predetermined supply pressure. Examples of the raw material gas supply source include a raw material gas bomb and a raw material gas infrastructure.

The ejector 5 is disposed on the raw material gas passage provided downstream of the booster 4. With this, the hydrogen-containing gas from the recycle passage 3 flows into the ejector 5 provided downstream of the booster 4. Therefore, the inflow of the condensed water into the booster 4 configured to supply the raw material gas to the reformer 1 can be suppressed as compared to conventional cases.

Operations of the hydrogen generator 100 according to the present embodiment may be the same as the operations of the hydrogen generator 100 according to Embodiment 1, so that detailed explanations thereof are omitted.

MODIFICATION EXAMPLE 1

The hydrogen generator according to Modification Example 1 of Embodiment 2 is configured such that in the hydrogen generator according to Embodiment 2, the heater heats the recycle passage.

According to this configuration, the possibility that the passage resistance increases by the condensed water in the ejector or the possibility that the passage clogging occurs by the condensed water in the ejector can be made lower than the conventional cases. In addition, the possibility that the passage resistance increases by the condensed water in the recycle passage or the possibility that the passage clogging occurs by the condensed water in the recycle passage can be made lower than the conventional cases.

Except for the above features, the hydrogen generator according to the present modification example may be the same in configuration as the hydrogen generator according to Embodiment 2.

Device Configuration

Figure 3:
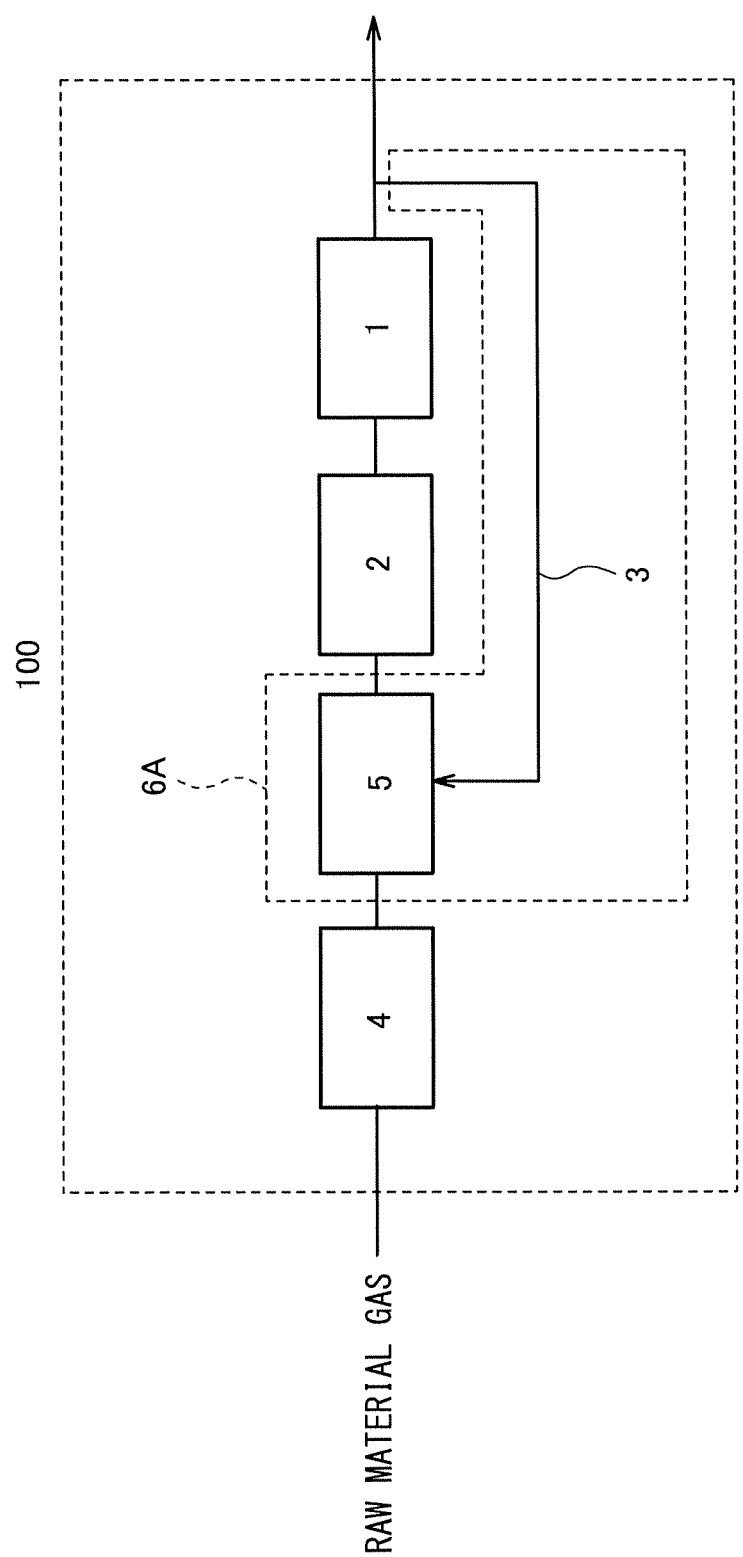
FIG. 3 is a diagram showing one example of the hydrogen generator according to Modification Example 1 of Embodiment 2.

FIG. 3 is a diagram showing one example of the hydrogen generator according to Modification Example 1 of Embodiment 2.

In the example shown in FIG. 3, the hydrogen generator 100 according to the present modification example includes the reformer 1, the hydro-desulfurizer 2, the recycle passage 3, the booster 4, the ejector 5, and a heater 6A.

Since the reformer 1, the hydro-desulfurizer 2, the recycle passage 3, the booster 4, and the ejector 5 are the same as those in Embodiment 2, explanations thereof are omitted.

The heater 6A heats the recycle passage 3. In the present modification example, as shown in FIG. 3, the heater 6A heats both the ejector 5 and the recycle passage 3.

The heat source of the heater 6A may be the same as the heat source of the heater 6 of Embodiment 2, so that a detailed explanation thereof is omitted.

Since the recycle passage 3 needs to be heated, the amount of heat from the heater 6A of the present modification example may be made larger than the amount of heat from the heater 6 of Embodiment 2, or the amount of heat from the heater 6A which is the same as the amount of heat from the heater 6 may be distributedly applied to the ejector 5 and the recycle passage 3. In the present modification example, the amount of heat from the heater 6A which is the same as the amount of heat from the heater 6 is distributedly applied to the ejector 5 and the recycle passage 3.

This is because even in the latter case, if the entire amount of heat from the heater 6A is applied to the gas flowing through the ejector 5 and the recycle passage 3, the amount of heat which is the same as the amount of heat from the heater 6 of Embodiment 2 can be regarded as being used for the heating of the gas in the ejector 5 as a whole.

With this, the recycled gas can be drawn into the ejector 5 while maintaining the high temperature of the recycled gas. Thus, the possibility that the passage resistance increases by the condensed water in the ejector 5 or the possibility that the passage clogging occurs by the condensed water in the ejector 5 can be made lower than the conventional cases. In addition, the temperature decrease of the recycled gas flowing through the recycle passage 3 can be suppressed. Thus, the possibility that the passage resistance increases by the condensed water in the recycle passage 3 or the possibility that the passage clogging occurs by the condensed water in the recycle passage 3 can be made lower than the conventional cases. By the action of heating the recycle passage 3, a condenser does not have to be disposed on the recycle passage 3, or even if a condenser is disposed on the recycle passage 3, the condenser can be reduced in size. With this, the configuration of the hydrogen generator 100 can be simplified, and the cost of the hydrogen generator 100 can be reduced.

MODIFICATION EXAMPLE 2

The hydrogen generator according to Modification Example 2 of Embodiment 2 is configured such that in the hydrogen generator according to Embodiment 2 or Modification Example 1 of Embodiment 2, the heater heats the reformer.

According to this configuration, the possibility that the passage resistance increases by the condensed water in the ejector or the possibility that the passage clogging occurs by the condensed water in the ejector can be made lower than the conventional cases. In addition, the possibility that the passage resistance increases by the condensed water in the recycle passage or the possibility that the passage clogging occurs by the condensed water in the recycle passage can be made lower than the conventional cases. Further, the heat of the heater can be efficiently utilized.

Except for the above features, the hydrogen generator according to the present modification example may be the same in configuration as the hydrogen generator according to Embodiment 2 or Modification Example 1 of Embodiment 2.

Device Configuration

Figure 4:
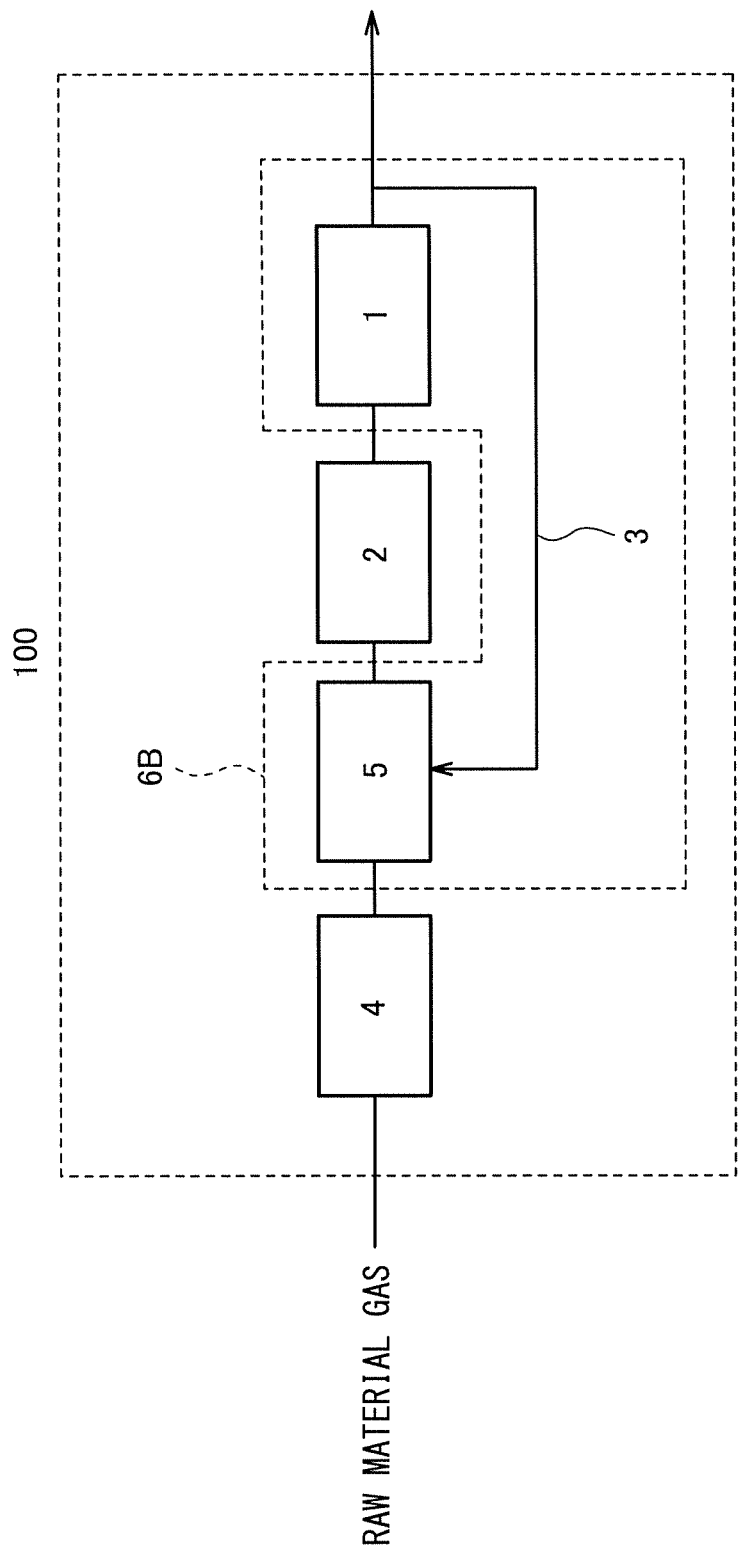
FIG. 4 is a diagram showing one example of the hydrogen generator according to Modification Example 2 of Embodiment 2.

FIG. 4 is a diagram showing one example of the hydrogen generator according to Modification Example 2 of Embodiment 2.

In the example shown in FIG. 4, the hydrogen generator 100 according to the present modification example includes the reformer 1, the hydro-desulfurizer 2, the recycle passage 3, the booster 4, the ejector 5, and a heater 6B.

Since the reformer 1, the hydro-desulfurizer 2, the recycle passage 3, the booster 4, and the ejector 5 are the same as those in Embodiment 2, explanations thereof are omitted.

The heater 6B heats the reformer 1. In the present modification example, as shown in FIG. 4, the heater 6B heats the ejector 5, the recycle passage 3, and the reformer 1. For example, the heat of the flue gas of the combustor configured to heat the reformer 1 may be used as the heat source of the heater 6B, or in the case of the fuel cell, such as the solid-oxide fuel cell, which operates at high temperature, the heat of the fuel cell may be used as the heat source of the heater 6B.

According to this configuration, the reformer 1, the recycle passage 3, and the ejector 5 can be integrally heated. By the heating of the reformer 1, the heat necessary in the catalytic reaction for generating the hydrogen-containing gas can be obtained. By the heating of the ejector 5, the possibility that the passage resistance increases by the condensed water in the ejector 5 or the possibility that the passage clogging occurs by the condensed water in the ejector 5 can be made lower than the conventional cases. By the heating of the recycle passage 3, the possibility that the passage resistance increases by the condensed water in the recycle passage or the possibility that the passage clogging occurs by the condensed water in the recycle passage can be made lower than the conventional cases.

By the above configuration, the amount of heat generated by the heater 6B can be efficiently utilized. For example, since the heat of the combustor that heats the reformer 1 can be utilized when heating the recycle passage 3 and the ejector 5, the condensation of the steam in the recycled gas can be efficiently prevented. Depending on the design of the hydrogen generator 100, the heat of the combustor that heats the reformer 1 can cover the entire amount of heat obtained from the heater 6B. Therefore, the configuration of the hydrogen generator 100 can be simplified. With this, the hydrogen generator 100 can be reduced in cost and size.

Embodiment 3

A fuel cell system according to Embodiment 3 includes: the hydrogen generator according to any one of Embodiment 2, Modification Example 1 of Embodiment 2, and Modification Example 2 of Embodiment 2; and a fuel cell operative to generate electric power by using the hydrogen-containing gas supplied from the hydrogen generator.

According to this configuration, in the hydrogen generator, as described above, the possibility that the passage resistance increases by the condensed water in the ejector or the possibility that the passage clogging occurs by the condensed water in the ejector can be made lower than the conventional cases. In addition, the inflow of the condensed water into the booster configured to supply the raw material gas to the reformer can be suppressed.

Device Configuration

Figure 5:
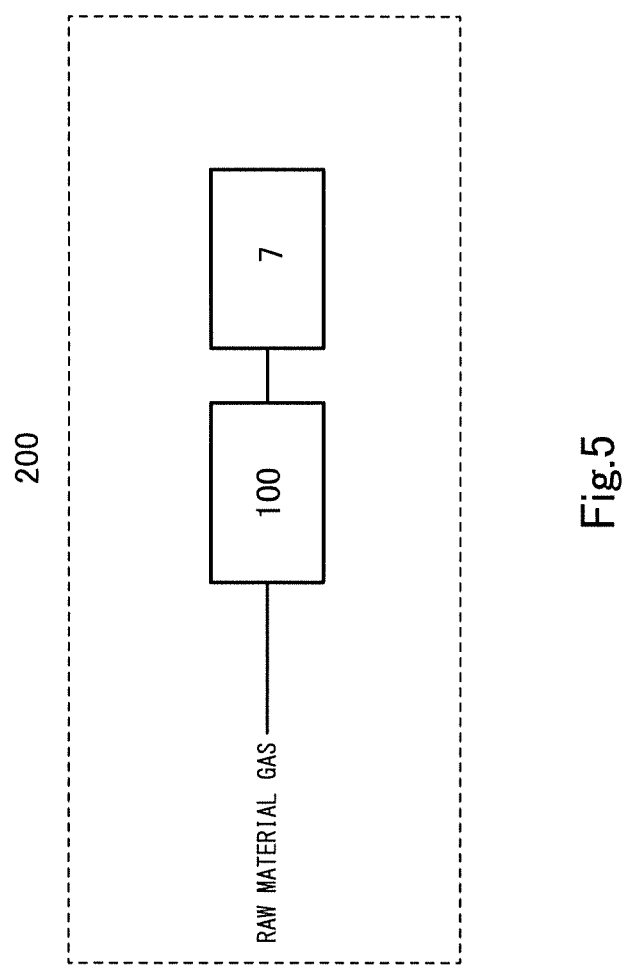
FIG. 5 is a diagram showing one example of a fuel cell system according to Embodiment 3.

FIG. 5 is a diagram showing one example of the fuel cell system according to Embodiment 3.

In the example shown in FIG. 5, a fuel cell system 200 according to the present embodiment includes: the hydrogen generator 100 according to any one of Embodiment 2, Modification Example 1 of Embodiment 2, and Modification Example 2 of Embodiment 2; and a fuel cell 7.

The fuel cell 7 generates electric power by using the hydrogen-containing gas supplied from the hydrogen generator 100. The fuel cell 7 may be any type of fuel cell, and examples of the fuel cell include a polymer electrolyte fuel cell, a solid-oxide fuel cell, and a phosphoric acid fuel cell.

Since the fuel cell 7 can be regarded as a hydrogen utilizing device configured to utilize the hydrogen-containing gas generated by the hydrogen generator 100 according to any one of Embodiment 2, Modification Example 1 of Embodiment 2, and Modification Example 2 of Embodiment 2, the operations of the hydrogen generator 100 according to the present embodiment are the same as the operations of the hydrogen generator 100 according to any one of Embodiment 2, Modification Example 1 of Embodiment 2, and Modification Example 2 of Embodiment 2. Therefore, detailed explanations of the operations of the hydrogen generator 100 according to the present embodiment are omitted.

Embodiment 4

The fuel cell system according to Embodiment 4 is configured such that: in the fuel cell system according to Embodiment 3, the fuel cell is a solid-oxide fuel cell; a hot module in which the reformer and the fuel cell are provided is included; and the ejector receives heat from the hot module.

According to this configuration, the heat of the solid-oxide fuel cell is effectively utilized for the heating of the ejector, and the hot module can serve as a heater. Therefore, the configuration of the fuel cell system can be simplified. With this, the fuel cell system can be reduced in cost and size.

Except for the above features, the fuel cell system according to the present embodiment may be the same in configuration as the fuel cell system according to Embodiment 3.

Device Configuration

Figure 6:
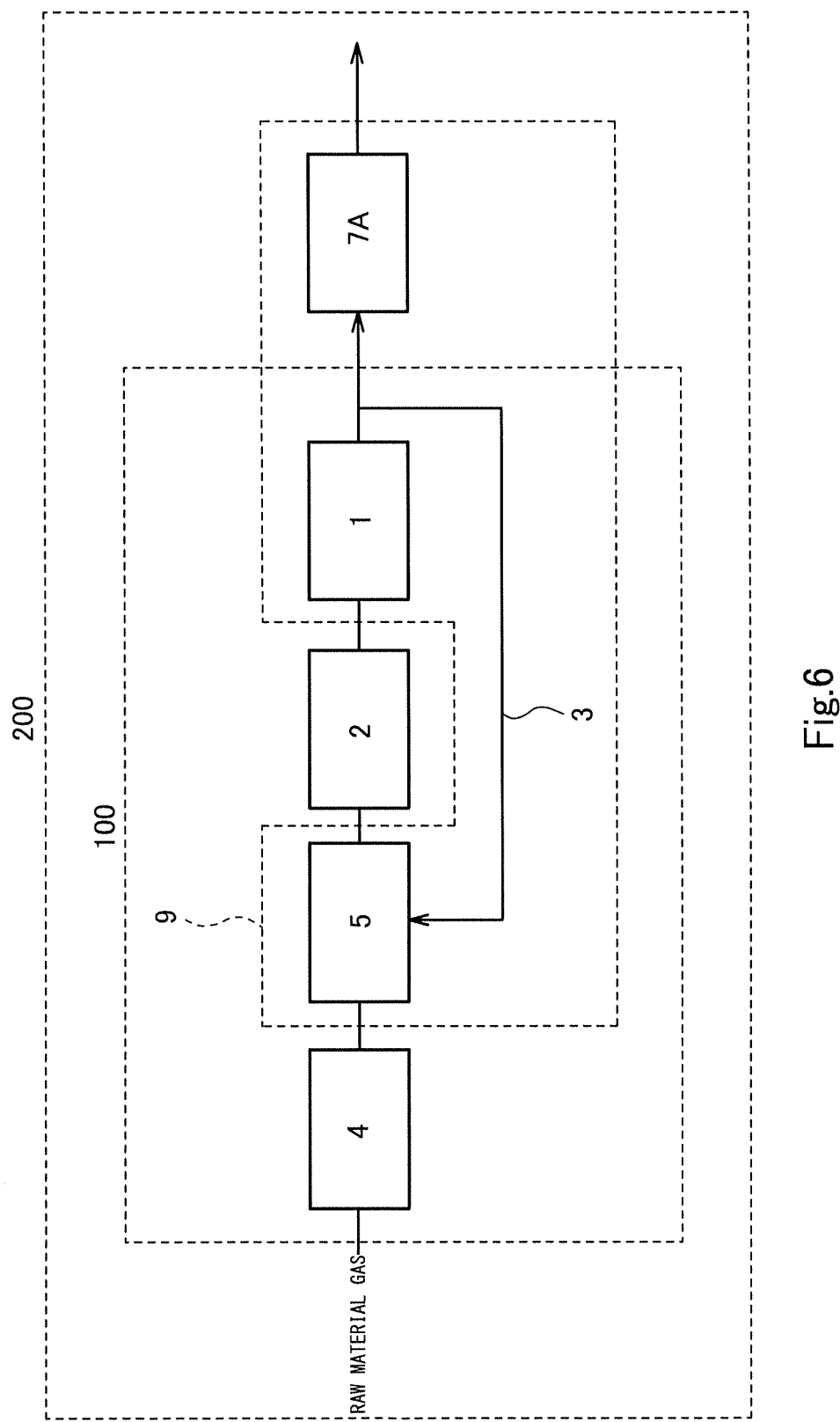
FIG. 6 is a diagram showing one example of the fuel cell system according to Embodiment 4.

FIG. 6 is a diagram showing one example of the fuel cell system according to Embodiment 4.

In the example shown in FIG. 6, the fuel cell system 200 includes the reformer 1, the hydro-desulfurizer 2, the recycle passage 3, the booster 4, the ejector 5, a solid-oxide fuel cell 7A, and a hot module 9.

Since the reformer 1, the hydro-desulfurizer 2, the recycle passage 3, the booster 4, and the ejector 5 are the same as those in Embodiment 3, explanations thereof are omitted.

The solid-oxide fuel cell 7A generates electric power by using the hydrogen-containing gas supplied from the hydrogen generator 100. Specifically, the solid-oxide fuel cell 7A uses ion-conductive ceramics as an electrolyte. Oxide ions purified by an air electrode pass through the electrolyte and react with the hydrogen in a fuel electrode. Thus, the solid-oxide fuel cell 7A generates electricity and heat. The operating temperature of the solid-oxide fuel cell 7A is high, that is, about 700° C. to 1,000° C. Therefore, to prevent the heat release from high-temperature portions of the fuel cell system 200 and efficiently utilize the heat of the high-temperature portions, typically, only the high-temperature portions of the fuel cell system 200 are integrated as a module to form a heat insulating configuration.

Therefore, as shown in FIG. 6, the hot module 9 includes therein the reformer 1 and the solid-oxide fuel cell 7A. In the present embodiment, the solid-oxide fuel cell 7A and the reformer 1 are examples of the high-temperature portions of the fuel cell system 200 and are integrated as a module. By integrating the high-temperature portions as a module, the heat release by the movement of the gas between devices that operate at high temperature is prevented, so that the heat efficiency of the fuel cell system 200 improves. In addition, by integrating the high-temperature portions as a module, the heat insulation of high heat efficiency can be realized.

The ejector 5 receives the heat from the hot module 9. Specifically, instead of the heaters 6, 6A, and 6B, the high-temperature hot module 9 heats the ejector 5. With this, the possibility that the passage resistance increases by the condensed water in the ejector 5 or the possibility that the passage clogging occurs by the condensed water in the ejector 5 can be made lower than conventional cases. Instead of the heaters 6A and 6B, the high-temperature hot module 9 may heat the recycle passage 3. With this, the possibility that the passage resistance increases by the condensed water in the recycle passage 3 or the possibility that the passage clogging occurs by the condensed water in the recycle passage 3 can be made lower than conventional cases.

In the present embodiment, as shown in FIG. 6, the recycle passage 3 and the ejector 5 are provided inside the hot module 9. With this, the recycle passage 3 and the ejector 5 easily receive heat from the hot module 9.

The durability of the booster 4 deteriorates under a high temperature environment, so that heat-resistant, expensive parts need to be used. Therefore, in the present embodiment, the booster 4 is provided outside the hot module 9, so that the booster 4 is less likely to receive the heat from the hot module 9.

FIG. 6 shows an example in which the hydro-desulfurizer 2 is provided outside the hot module 9. However, the hydro-desulfurizer 2 may be provided inside the hot module 9. With this, the hydro-desulfurizer 2 can be heated by the hot module 9.

The operations of the fuel cell system 200 according to the present embodiment may be the same as those in Embodiment 3, so that detailed explanations thereof are omitted.

Embodiment 5

The fuel cell system according to Embodiment 5 is configured such that the fuel cell system according to Embodiment 4 includes an on-off valve disposed on the raw material gas passage extending between the booster and the ejector, and the on-off valve is provided outside the hot module.

According to this configuration, the flow of the gas between the booster and the ejector can be appropriately blocked by using the on-off valve.

Except for the above features, the fuel cell system according to the present embodiment may be the same in configuration as the fuel cell system according to Embodiment 4.

Device Configuration

Figure 7:
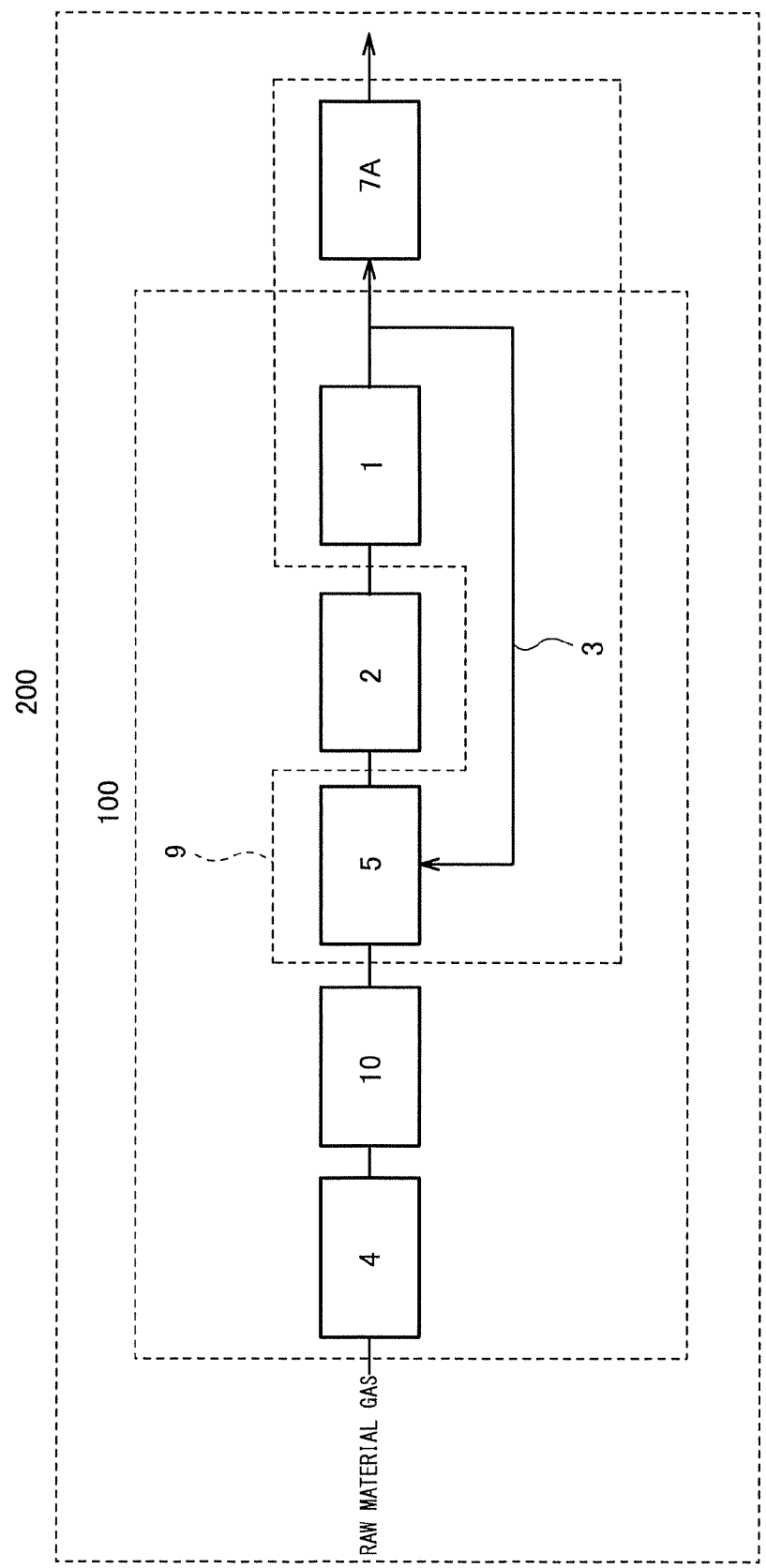
FIG. 7 is a diagram showing one example of the fuel cell system according to Embodiment 5.

In the example shown in FIG. 7, the fuel cell system 200 includes the reformer 1, the hydro-desulfurizer 2, the recycle passage 3, the booster 4, the ejector 5, the solid-oxide fuel cell 7A, the hot module 9, and an on-off valve 10.

Since the reformer 1, the hydro-desulfurizer 2, the recycle passage 3, the booster 4, the ejector 5, the solid-oxide fuel cell 7A, and the hot module 9 are the same as those in Embodiment 4, explanations thereof are omitted.

The on-off valve 10 is disposed on the raw material gas passage extending between the booster 4 and the ejector 5. With this, the flow of the gas between the booster 4 and the ejector 5 is blocked. The on-off valve 10 may have any configuration as long as it can block the flow of the gas between the booster 4 and the ejector 5. For example, the on-off valve 10 may be a solenoid valve.

The on-off valve 10 is provided outside the hot module 9. To realize stable operations of the on-off valve 10 under a high temperature environment, a large-scale on-off valve needs to be constituted by expensive members as the on-off valve 10. However, the use of such on-off valve 10 may cause the increases in cost and size of the fuel cell system 200. Therefore, in the present embodiment, the on-off valve 10 is provided outside the hot module 9, so that the on-off valve 10 is less likely to receive the heat from the hot module 9.

FIG. 7 shows an example in which the hydro-desulfurizer 2 is provided outside the hot module 9. However, the hydro-desulfurizer 2 may be provided inside the hot module 9. With this, the hydro-desulfurizer 2 can be heated by the hot module 9.

Operations

Hereinafter, the operations of the fuel cell system 200 will be explained in reference to FIG. 7.

When the fuel cell system 200 is operating, the on-off valve 10 is open. With this, the raw material gas can be supplied to the ejector 5 by the booster 4.

When the fuel cell system 200 stops operating, the on-off valve 10 is closed. With this, the flow of the gas between the booster 4 and the ejector 5 is blocked by the on-off valve 10, so that the supply of the raw material gas from the booster 4 to the ejector 5 is stopped. There is a possibility that in a case where the on-off valve 10 remains open, a residual gas flows from the booster 4 into the ejector 5 for a while even after the stop of the operation of the booster 4. This possibility can be reduced by closing the on-off valve 10.

Since the flow of the gas between the booster 4 and the ejector 5 is blocked by the on-off valve 10, the backward flow of the gas in the hot module 9 to the booster 4 can be prevented. For example, depending on the behaviors of the reformer 1 and the solid-oxide fuel cell 7A, the gas in the hot module 9 may flow backward to the booster 4 by the increase in internal pressure of the reformer 1 or the solid-oxide fuel cell 7A. Examples of the gas in the hot module 9 include: the raw material gas; the recycled gas; the hydrogen-containing gas before the hydrogen-containing gas flows into the solid-oxide fuel cell 7A; and the hydrogen-containing gas (off gas) that has flowed out from the solid-oxide fuel cell 7A. If the gas flows backward to the booster 4, there are possibilities that the booster 4 malfunctions and that the passage resistance increases by the condensed water in the booster 4 or the passage clogging or the like occurs by the condensed water in the booster 4. Such possibilities can be reduced by closing the on-off valve 10.

Open and close timings of the on-off valve 10 may be associated with operation timings of the gas supply by the booster 4. For example, the on-off valve 10 may open substantially simultaneously with or before an operation start timing of the booster 4, and the on-off valve 10 may close substantially simultaneously with or after an operation stop timing of the booster 4.

Except for the above operations, the operations of the fuel cell system 200 according to the present embodiment may be the same as those in Embodiment 4.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

According to one aspect of the present invention, the possibility that the passage resistance increases by the condensed water in the ejector into which the hydrogen-containing gas from the recycle passage flows or the possibility that the passage clogging occurs by the condensed water in the ejector can be made lower than the conventional cases. Therefore, the aspect of the present invention can be utilized in hydrogen generators, fuel cell systems, and the like.

REFERENCE SIGNS LIST

1 reformer
2 hydro-desulfurizer
3 recycle passage
4 booster
5 ejector
6, 6A, 6B heater
7 fuel cell
7A solid-oxide fuel cell
9 hot module
10 on-off valve
100 hydrogen generator
200 fuel cell system

The invention claimed is:

1. A hydrogen generator comprising:
   a reformer operative to generate a hydrogen-containing gas by using a raw material gas;
   a hydro-desulfurizer operative to remove a sulfur compound in the raw material gas;
   a recycle passage through which the hydrogen-containing gas is supplied to the raw material gas before the raw material gas flows into the hydro-desulfurizer;
   an ejector which is disposed on a raw material gas passage provided upstream of the hydro-desulfurizer and into which the hydrogen-containing gas flows from the recycle passage; and
   a heater operative to heat the ejector.

2. The hydrogen generator according to claim 1, further comprising a booster operative to supply the raw material gas to the reformer, wherein
   the ejector is disposed on the raw material gas passage provided downstream of the booster.

3. The hydrogen generator according to claim 2, wherein the heater heats the recycle passage.

4. The hydrogen generator according to claim 2, wherein the heater heats the reformer.

5. A fuel cell system comprising:
   the hydrogen generator according to claim 2; and
   a fuel cell operative to generate electric power by using the hydrogen-containing gas supplied from the hydrogen generator.

6. The fuel cell system according to claim 5, wherein:
   the fuel cell is a solid-oxide fuel cell;
   a hot module in which the reformer and the fuel cell are provided is included; and
   the ejector receives heat from the hot module.

7. The fuel cell system according to claim 6, further comprising an on-off valve disposed on the raw material gas passage extending between the booster and the ejector, wherein
   the on-off valve is provided outside the hot module.

* * * * *